United States Patent [19]
Zeidler et al.

[11] 3,910,975
[45] Oct. 7, 1975

[54] PROCESS FOR THE CATALYTIC OXIDATION OF VICINAL DIOLS

[75] Inventors: Ulrich Zeidler, Dusseldorf-Benrath; Herbert Lepper, Cologne-Mulheim, both of Germany

[73] Assignee: Henkel & Cie G.m.b.H., Dusseldorf-Holthausen, Germany

[22] Filed: Nov. 7, 1973

[21] Appl. No.: 413,689

[30] Foreign Application Priority Data
Nov. 20, 1972 Germany............... 2256888

[52] U.S. Cl............................ 260/413; 260/531 R
[51] Int. Cl.² ........................................ C08H 17/36
[58] Field of Search ................. 260/413, 531 R

[56] References Cited
UNITED STATES PATENTS
3,711,523  1/1973  Pultinas et al. ............... 260/413
3,816,525  6/1974  Schreyer et al. ............... 260/531 R FOREIGN PATENTS OR APPLICATIONS
809,452  2/1959  United Kingdom............... 260/413

OTHER PUBLICATIONS
de Vries et al., *Tetrahedron Letters*, 1968, No. 54, pp. 5689–5690.

*Primary Examiner*—Ethel G. Love
*Attorney, Agent, or Firm*—Hammond & Littell

[57] ABSTRACT

An improved process for the oxidative cleavage of vicinal diols having more than 2 carbon atoms in the presence of catalytic amounts of a cobalt-(II) catalyst, by the addition of the reaction mixture of an initiator selected from polyhydric alcohols, ketones and/or hydroxy-ketones having from 2 to 6 carbon atoms, at least two oxygen atoms and the number of carbon atoms never exceeding three times the number of oxygen atoms, optionally in the form of their metal complexes.

6 Claims, No Drawings

3,910,975

PROCESS FOR THE CATALYTIC OXIDATION OF VICINAL DIOLS

THE PRIOR ART

Processes for the oxidation of vicinal diols with equivalent quantities of lead tetraacetate, periodate, and other compounds having atoms of high oxidation level have been known for a long time. However, during recent years, several processes have become known (see the copending U.S. patent application Ser. No. 150,222, filed June 4, 1971 and Ser. No. 166,309, filed July 26, 1971) in which for the oxidative splitting of the diols, oxygen is used in the presence of catalytic quantities of heavy metal ions, especially cobalt ions. In general, this oxidation is so carried out that at an elevated temperature, a solution of the vicinal diol and catalytic quantities of cobalt salt are brought into close contact with an oxygen-containing gas by stirring, shaking, or use of a frit. The induction period preceding the exothermal reaction, which can be observed analogously to that occurring at autoxidation reactions, requires, in many cases, a considerable part of the total reaction time. The duration of the induction period above all depends upon the content of inhibitor in the starting material, diol, solvent, and catalyst as well as upon the temperature and the catalyst concentration and can be influenced by the variation of these parameters. However, this is mostly a problem only within the experimental conditions required for the oxidative splitting.

Measures for maintaining the normal yield, such as, for example, the use of solvents freed from potential inhibitors by special purificatory measures cannot be considered because of economical reasons; therefore, experiments have been already conducted to shorten the induction period by the addition of appropriate substances to the reaction mixture. Especially for the oxidative splitting of vicinal diols, the introduction into the reaction mixture of up to 20 to 30 mols of percarboxylic acids per 100 mols of diol as initiators has been suggested.

OBJECTS OF THE INVENTION

An object of the invention is to satisfy the need existing on account of the above-described facts and to develop a process which, based on the known possibility of splitting vicinal diols with oxygen in the presence of catalysts, can be carried out on a commercial scale by the addition of an initiator to the reaction mixture.

Another object of the invention is the development, in the process for the oxidative cleavage of vicinal diols consisting of the steps of contacting a vicinal diol having at least 3 carbon atoms in the liquid phase with an oxygen-containing gas in the presence of a cobalt ion catalyst and optionally an inert solvent and recovering cleavage products selected from the group consisting of carboxylic acids, ketones and aldehydes, of the improvement consisting of conducting said oxidative cleavage reaction in the presence of an initiator selected from the group consisting of (i) polyhydric alcohols, ketones and hydroxyketones having from 2 to 6 carbon atoms, at least two oxygen atoms and the number of carbon atoms never exceeding three times the number of oxygen atoms, and (ii) their metal complexes.

These and other objects of the invention will become more apparent as the description thereof proceeds.

DESCRIPTION OF THE INVENTION

It has now been found that when oxygen-containing gases in the presence of cobalt ions and, if necessary, in the presence of inert organic solvents are used for the cleavage of vicinal diols to form carboxylic acids, ketones, and aldehydes, a shortening of the induction period is possible if the oxidative cleavage is carried out while adding polyhydric alcohols, ketones and/or hydroxyketones with maximally 6 carbon atoms, which compounds contain at least two oxygen atoms and 2 carbon atoms, having a number of carbon atoms exceeding that of the oxygen atoms by at most three, and are potentially present in the form of their metal complexes.

More particularly, the invention relates to the development, in the process for the oxidative cleavage of vicinal diols consisting of the steps of contacting a vicinal diol having at least 3 carbon atoms in the liquid phase with an oxygen-containing gas in the presence of a cobalt ion catalyst and optionally an inert solvent and recovering cleavage products selected from the group consisting of carboxylic acids, ketones and aldehydes, of the improvement consisting of conducting said oxidative cleavage reaction in the presence of an initiator selected from the group consisting of (i) polyhydric alcohols, ketones and hydroxyketones having from 2 to 6 carbon atoms, at least two oxygen atoms and the number of carbon atoms never exceeding three times the number of oxygen atoms, and (ii) their metal complexes.

The initiator additives of the invention should be soluble in the reaction mixture per se or after addition thereto of the optionally utilized solvents listed below.

More particularly, these initiator additives are aliphatic compounds selected from the group consisting of alkanepolyols, alkanepolyones and alkanolones as well as their metal complexes, preferably their cobalt complexes. Such compounds are, for example, ethylene glycol, propanediol-1,2, glycerol, diacetyl, acetylacetone, cobalt-(II) acetylacetonate, [cobalt-(II) (ethyleneglycol)$_3$] acetate, etc.

The effect of the above-described compounds is to be regarded as surprising because, until now, substances having these structures were not known to be activators of oxidation or autoxidation reactions whereas additives which are regarded as autoxidation initiators exert only a lesser effect on the induction period of the vicinal diol cleavage reaction.

The amount of initiator to be used is not critical. In general, one can operate with the range of about 0.5 to 5 mol percent of initiator.

When the improved process of the invention is used, the customary reaction conditions need not be changed.

The process of the invention can be applied to vicinal diols having primary, secondary and tertiary alcohol groups in the diol group, which diols may be purely acyclic or may contain cycloalkyl groups and aryl groups. They also, if desired, may be substituted by such hetero-atoms or hetero-atom groups which under the prevailing reaction conditions, cannot be oxidized, such as, for example, halogen atoms, ether groups, ester groups, etc. Preferably the diols utilized have the formula

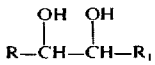

wherein R is a member selected from the group consisting of alkyl having from 1 to 12 carbon atoms, cycloalkylalkyl having from 6 to 12 carbon atoms, phenyl, and phenylalkyl having from 7 to 12 carbon atoms, $R_1$ is a member selected from the group consisting of hydrogen and R, and R and $R_1$ together are butylene. Preferably, the vicinal diols are aliphatic where R is alkyl having 1 to 8 carbon atoms and $R_1$ is hydrogen or alkyl having 1 to 8 carbon atoms.

Especially useful are diols having 6 to 35 carbon atoms. Examples of compounds which can be oxidized according to the process of the invention are the following:

hexanediol-1,2
octanediol-2,3
octadecanediol-9,10
heptanediol-1,2
hexanediol-3,4
octanediol-1,2
nonanediol-1,2
decanediol-1,2
octanediol-4,5
decanediol-5,6
dodecanediol-6,7
tetradecanediol-7,8
hexadecanediol-8,9
cyclohexanediol-1,2
1,2-diphenyl-ethanediol-1,2
phenyl-ethanediol-1,2
3,4-dimethyl-hexanediol-3,4
2,3-dimethyl-heptanediol-2,3
3-methyl-4-ethyl-hexanediol-3,4
2-methyl-3-butyl-heptanediol-2,3
7,8-dimethyl-tetradecanediol-7,8
11,12-dimethyl-docosanediol-11,12
3-ethyl-pentanediol-2,3
3,5-dimethyl-hexanediol-2,3
3,4-dimethyl-hexanediol-2,3
3-methyl-octanediol-2,3
4-propyl-heptanediol-3,4
5-butyl-decanediol-5,6
5-butyl-tetradecanediol-5,6
7-hexyl-heptadecanediol-7,8
2-methyl-butanediol-1,2
2,3-dimethyl-butanediol-1,2
2,4,4-trimethyl-pentanediol-1,2.

These diols may be used singly or in admixture with one another, i.e., in particular the diol mixtures obtained by hydroxylation of certain olefin fractions may also be used.

In the process of the invention, the oxidation of the above-described diols and cleavage to aldehydes, carboxylic acids, or ketones depends upon their structure and the reaction conditions. The catalysts used in each case are salts, oxides, sulfides and complex compounds of divalent cobalt. The preferred catalysts are cobalt-(II) compounds which are soluble in the reaction mixture, for example, the cobalt-(II) salts of higher fatty acids, such as, for example, lauric acid, myristic acid or palmitic acid.

The amount of catalyst employed can vary widely. Amounts of from 0.01 to 10% by weight, based on the diol, of the cobalt-(II) compounds are customarily employed.

The temperatures to be utilized in the reaction lie in the range between 40° and 200°C whereby the preferred ranges vary according to the starting material and the product to be manufactured.

As an example, when the process of the invention is used for the manufacture of aldehydes, it is advantageous to maintain the temperature within the limits disclosed in the copending commonly-assigned U.S. patent application Ser. No. 150,222, filed June 4, 1971, in order to ensure rapid removal of the resulting aldehyde from the reaction mixture. These temperatures should be at least 50°C below the boiling point of the diol used and at the most, 50°C below the boiling point of the resulting aldehyde while on the whole, the above-quoted range is maintained.

The use of solvents in the process of the invention depends upon the starting material and the product to be manufactured. In principle, the use of solvents can be avoided; however, when the oxidative cleaving of the diols is to lead to carboxylic acids, then the use of a high boiling solvent is advantageous in order to prevent the oxidizing gas from removing the intermediately formed aldehydes from the reaction mixture. According to the copending commonly-assigned U.S. patent application Ser. No. 166,309, filed July 26, 1971, suitable solvents to be used in this case are the ones having boiling points above 80°C. It is of special advantage to use, as solvents, the carboxylic acids to be manufactured in the process.

In general, the solvents to be used in the process of the invention can be non-polar, polar-aprotic, as well as polar-protic solvents. Accordingly, the following examples of solvents may be used: paraffin hydrocarbons, for example, benzine fractions, carboxylic acid esters, benzonitrile, carboxylic acids, chlorobenzene.

The oxidation gas used may be air or other oxygen-/inert gas mixtures. Preferably pure oxygen, i.e., oxygen of commercial quality, which does not contain more than 10% by volume of other gases, is used as the oxidation gas.

The oxidation gases should be brought in contact with the diol to be oxidized in as finely divided state as possible. This may be effected in a batch process by blowing in the gas through several fine jets at the bottom of the reaction vessel. A high speed stirrer can also be introduced directly above the oxygen inlet at the bottom of the reaction vessel, or the stirrer itself may be provided with bores for the supply of oxidation gas. In a continuous operation it is advisable to pass the oxidation gas and diol to be reacted in countercurrent, and thus to provide the most intimate contact possible between the reactants, for example, by use of spray columns or falling film columns. Another possibility for the development of a continuous process consists in spraying the catalyst-containing diol or diol mixture into a stream of oxygen.

When working in at high temperatures, and with relatively large amounts of reactants, it is advisable to preheat the oxidation gas to the temperature of the reaction mixture. The rate of introduction of the stream of oxidation gas is dependent upon several experimental parameters and, therefore, cannot be estimated in advance for all types of operation. This velocity depends also upon the design of the equipment whereby the type of gas feed and the distribution of the gas in the reaction mixture is of special importance. Moreover, this velocity depends upon the quantity of material to be converted, upon continuous or batchwise operation and finally, upon the respective operating temperature.

Provided that the reaction products are not already removed from the reaction vessel as in the case of aldehyde manufacture and partly in the case of ketone manufacture, the reaction products can be worked up by distillation or in the case of carboxylic acids by extraction with aqueous alkaline solutions.

The extent to which the induction period is shortened in the process of the invention depends upon the experimental condition used in each particular case and can, therefore, be stated only for each individual case. The duration of the induction period can be defined as the time period which starts with the addition of the catalyst-initiator mixture to the diol or the diol-solvent mixture that has been adjusted by a thermostat to the desired reaction temperature and which ends with the sudden increase of the temperature which occurs when the reaction sets in. The reliability of the end-point indication of the temperature measurement can be ascertained by titrimetric determination of the diol content.

The advantages attainable by the invention especially consist in obviating the need for the pre-purification of the reaction components because of the presence of very small quantities of foreign substances. The effect attainable by the use of the substances according to the invention could not be anticipated since it had to be surmised that only typical autoxidation catalysts would show an effect. The initiator substances according to the invention have not been described as such catalysts and, on the other hand, typical autoxidation catalysts, such as the peroxides, show a distinctly lesser effect.

The invention will be illustrated with reference to the following examples which are not limitative in any respect.

EXAMPLE 1

20 Grams of a mixture of aliphatic central vicinal diols having chain length of 14 to 18 carbon atoms (average molecular weight 256) were dissolved in 200 ml of n-butyl acetate. The mixture was heated to 100°C and maintained there. Thereafter, an oxygen current which via a frit was caused to flow into the mixture with a velocity of 0.2 ml/min. Then 2 mol percent of cobalt-(II) laurate and 5 mol percent of ethyleneglycol were added to the reaction mixture. The induction period was terminated after 4 minutes. The reaction mixture was worked up by distillation. The yield of carboxylic acids having a chain length of 7 to 9 carbon atoms amounted to 82% of the theoretical.

The duration of the induction period varied in different batches even under the same experimental conditions. Hence, eight additional identical experiments were conducted. On the average, the induction period was terminated after 6 minutes. The yield of carboxylic acids lay between 80 and 83% of the theory.

As a comparison, the procedure was repeated without the addition of ethylene glycol. This resulted in an induction period of 35 minutes. The yield of carboxylic acids remained unchanged at 83% of the theory. Eleven additional experiments gave an average induction period of 40 minutes.

EXAMPLE 2

Example 1 was repeated, except that butyl acetate was replaced with n-decanoic acid as the solvent. The induction period was 33 minutes.

Repetition of this experiment in the absence of ethyleneglycol resulted in an induction period of 1 hour and 20 minutes.

EXAMPLE 3

Example 1 was repeated, except that ethyleneglycol was replaced with 4 mol percent of acetylacetone. The induction period was terminated after 8 minutes.

EXAMPLE 4

Example 1 was repeated, except that instead of cobalt-(II) laurate, there was added 2 mol percent of the complex $[Co(ethyleneglycol)_3]$ $(CH_3COO)_2$. The induction period was terminated after 4 minutes. In this case ethylene glycol was absent.

The preceding specific embodiments are illustrative of the practice of the invention. It is to be understood, however, that other embodiments known to those skilled in the art or disclosed herein may be employed without departing from the spirit of the invention or the scope of the appended claims.

We claim:

1. In the process for the oxidative cleavage of vicinal diols consisting of the steps of contacting a vicinal diol having from 6 to 35 carbon atoms in the liquid phase with an oxygen-containing gas in the presence of a cobalt ion catalyst and optionally an inert solvent and recovering carboxylic acids, the improvement consisting of conducting said oxidative cleavage reaction in the presence of an initiator selected from the group consisting of ethylene glycol, propane-diol-1,2, glycerol, diacetyl and acetylacetone.

2. The process of claim 1 wherein said oxidative cleavage reaction is conducted at temperatures from 40° to 200°C.

3. The process of claim 1 wherein said vicinal diol is aliphatic.

4. The process of claim 1 wherein from 0.5 to 5 mol percent of said initiator is employed.

5. The process of claim 4 wherein said initiator is ethylene glycol.

6. The process of claim 4 wherein said initiator is acetylacetone.

* * * * *